Dec. 4, 1951     J. SCHAETZLE     2,577,633

ADJUSTABLE PLUG GAUGE

Filed April 10, 1947

INVENTOR.
Jacob Schaetzle
BY William B. Jaspert
ATTY.

Patented Dec. 4, 1951

UNITED STATES PATENT OFFICE 2,577,633

ADJUSTABLE PLUG GAUGE

Jacob Schaetzle, Pittsburgh, Pa.

Application April 10, 1947, Serial No. 740,511

1 Claim. (Cl. 33—178)

This invention relates to gages, more particularly to adjustable plug gages for use in precision work and which obviates the need for the maintenance of a large number of different sized gages.

In metal machining arts, plug gages are commonly employed for measuring the bores in themselves and with relation to other bores or surfaces and where, in jig making, for example, a plurality of bores are machined in a predetermined relation to one another, their distances must be micrometrically gaged prior to the completion or finished tooling of the bores. For this purpose it is necessary to employ numerous different sized plug gages for measuring the spacing of the bores in the intermediate stages of the machining operations. These gages being costly, it is frequently necessary that the machine operator make gages for this purpose as he goes along.

In avoidance of such delays and expense, the present invention provides an adjustable plug gage which may be adjusted to size so as to be available for measuring different size bores or bores in intermediate stages of their machining operations by a simple adjustment of the gage to fit the bore. The gage may then be measured at its adjusted position to determine the precise dimensions of the bore and with reference to other bores to determine the spacing of the bores as measured across a pair of such adjustable gages.

Figure 1:
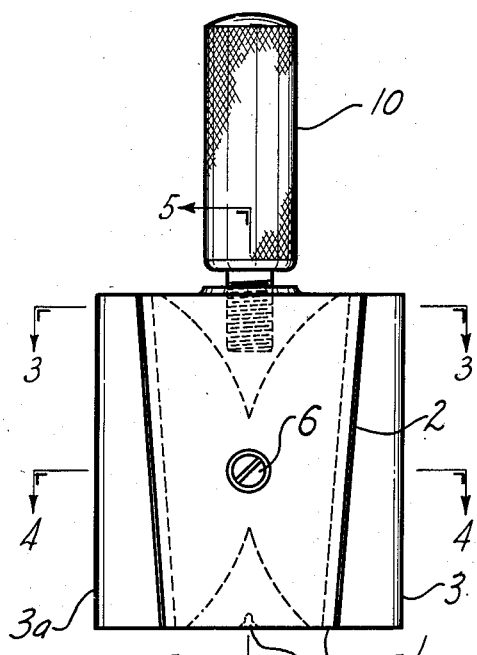
Figure 2:
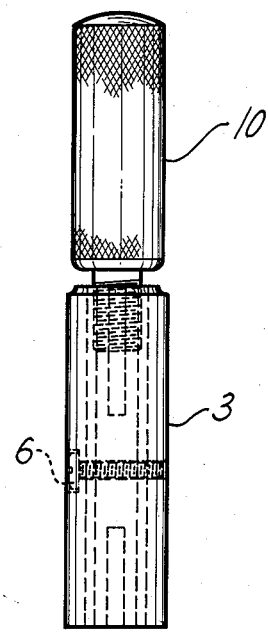
Figure 3:
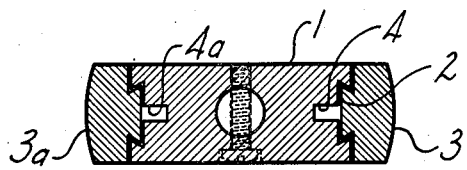
Figure 5:
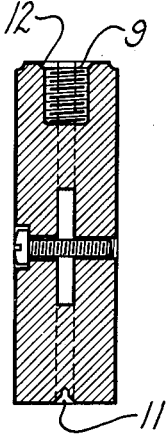
Figure 4:
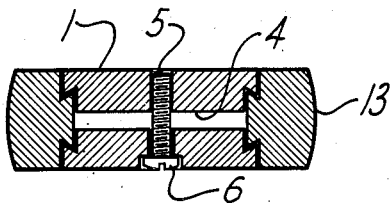

The invention will become more apparent from a consideration of the accompanying drawing, constituting a part hereof, in which like reference characters designate like parts, and in which Fig. 1 is a front elevational view of an adjustable plug gage embodying the principles of this invention;

Fig. 2 a side elevational view thereof;

Fig. 3 a cross sectional view taken along the line 3—3, Fig. 1;

Fig. 4 a similar view taken along the line 4—4, Fig. 1;

Fig. 5 a vertical section taken along the line 5—5, Fig. 1; and

Figure 6:
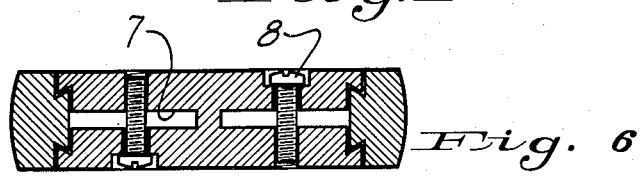

Fig. 6 a cross sectional view of a modified form of plug gage.

With reference to the drawing, the numeral 1 designates a center block having dovetailed ways 2 for receiving the outer blocks 3, having complementary dovetailed tongues that interact with the ways 2 of the center block 1.

The ways 2 of the center block are tapered as shown in Fig. 1, as is also one face of the outer blocks 3, so that by sliding the outer blocks in the ways of the center block 1 the outer diameter or outside dimension from the surface of the block 3 to the outer surface of the block 3a may be varied. To secure the outer blocks 3 and 3a in the ways 2 in their adjusted position, the center block 1 is slotted as shown at 4 and 4a, the slots running together at the center as shown in Fig. 4. By tapping a threaded opening 5 in the center of the block 1 and employing a screw 6, the center portion of the block 1 may be drawn together to exert a clamping action of the ways 2 on the dovetailed tongues of the outer blocks 3. The slots 4 and 4a may be cut in the center block 1 by circular saws, or the center block 1 may be slotted as shown in the modified form of the device of Fig. 6, there being two straight slots 7 extending the full length of the center block forming clamping faces which may be drawn together by the screws 8.

As shown in Fig. 5, the center block is provided with a threaded socket 9 for receiving a knurled handle 10 and the block is provided with a center 11 and a center 12 by which it may be mounted for grinding. In other words, in the position of the outer blocks 3 and 3a as shown in Fig. 1, secured by the center screw 6, the adjustable plug gage may be set up between centers 11 and 12 and ground to the curvature 13. This surface 13 may be reground as it is subjected to wear.

One advantage of the use of adjustable plug gates as herein described is that fewer gages are needed in toolrooms of industrial plants. For example, one gage may be adjustable within the range of from one-half to three-quarters of an inch, and another from three-quarters to one inch or one inch and one-quarter, etc.

Although one embodiment of the invention has been herein illustrated and described, it will be evident to those skilled in the art that various modifications may be made in the details of construction without departing from the principles herein set forth.

I claim:

An adjustable plug gage comprising a center block having parallel faces and grooved inclined sides, gage blocks having tongues movably mounted in the grooves of said center block, said center block having communicating slots extending from the grooves a substantial distance through the section of the block to constitute the grooves resilient gripping members, and means consisting of a screw extending through the communicating portion of said slots for drawing the slotted sections of the block toward each other to effect clamping engagement of the grooves with the tongues of said gage blocks.

JACOB SCHAETZLE.

REFERENCES CITED

The following references are of record in the file of this patent:

UNITED STATES PATENTS

| Number | Name | Date |
|---|---|---|
| 1,542,026 | Bath | June 16, 1925 |
| 2,238,515 | Bath | Apr. 15, 1941 |

FOREIGN PATENTS

| Number | Country | Date |
|---|---|---|
| 49,000 | Sweden | Apr. 20, 1921 |
| 136,427 | Great Britain | Dec. 18, 1919 |
| 322,052 | Germany | June 19, 1920 |